Oct. 17, 1933.  W. J. SHAW  1,930,599
WOOD HEEL MACHINE
Filed Sept. 6, 1929  5 Sheets-Sheet 1

Fig.1
Fig.2
Fig.3

Inventor
Wesley J. Shaw
By David Rines
Attorney

Oct. 17, 1933.  W. J. SHAW  1,930,599
WOOD HEEL MACHINE
Filed Sept. 6, 1929   5 Sheets-Sheet 2

Inventor
Wesley J. Shaw
By David Rines
Attorney

Oct. 17, 1933.  W. J. SHAW  1,930,599
WOOD HEEL MACHINE
Filed Sept. 6, 1929    5 Sheets-Sheet 3

Oct. 17, 1933.　　　W. J. SHAW　　　1,930,599
WOOD HEEL MACHINE
Filed Sept. 6, 1929　　　5 Sheets-Sheet 4

Oct. 17, 1933.   W. J. SHAW   1,930,599
WOOD HEEL MACHINE
Filed Sept. 6, 1929   5 Sheets-Sheet 5

Inventor
Wesley J. Shaw
By David Rives
Attorney

Patented Oct. 17, 1933

1,930,599

UNITED STATES PATENT OFFICE 1,930,599

WOOD HEEL MACHINE

Wesley John Shaw, Haverhill, Mass., assignor, by mesne assignments, to United Shoe Machinery Corporation, Paterson, N. J., a corporation of New Jersey Application September 6, 1929. Serial No. 390,780

29 Claims. (Cl. 12—47.1)

The present invention relates to machines for operating on heels, and more particularly to machines for grooving and shank shaping Louis wood-heel blocks. Some features of the invention are, however, of more general application.

The breasts of Louis-heel blocks have been grooved by machinery for many years. The blocks are placed upon a carrier which carries them past a breast-grooving cutter. The cutter is so shaped, and the path of travel of the blocks past the cutter is such, that the resulting groove in the breast is given the Louis heel breast curve from the heel seat portion to the tread portion.

After such a breast-grooving operation, it is necessary to round or shape the shank lip of the grooved heel blank, to fit the curve of the sole at the heel breast. This operation is commonly spoken of as "shank shaping" or "shank scouring". This is a troublesome and difficult operation that has, in the past, been performed by hand, and has been very slow and expensive.

It has, accordingly, been heretofore proposed to groove the breast and shape the shank in a single operation.

The object of the present invention is to produce a new machine for forming the breast groove and shaping the shank lip of a Louis heel. The invention resides in the various combinations of parts and details of construction pointed out in the appended claims.

The invention will now be described in connection with the accompanying drawings, in which.

Figure 4:
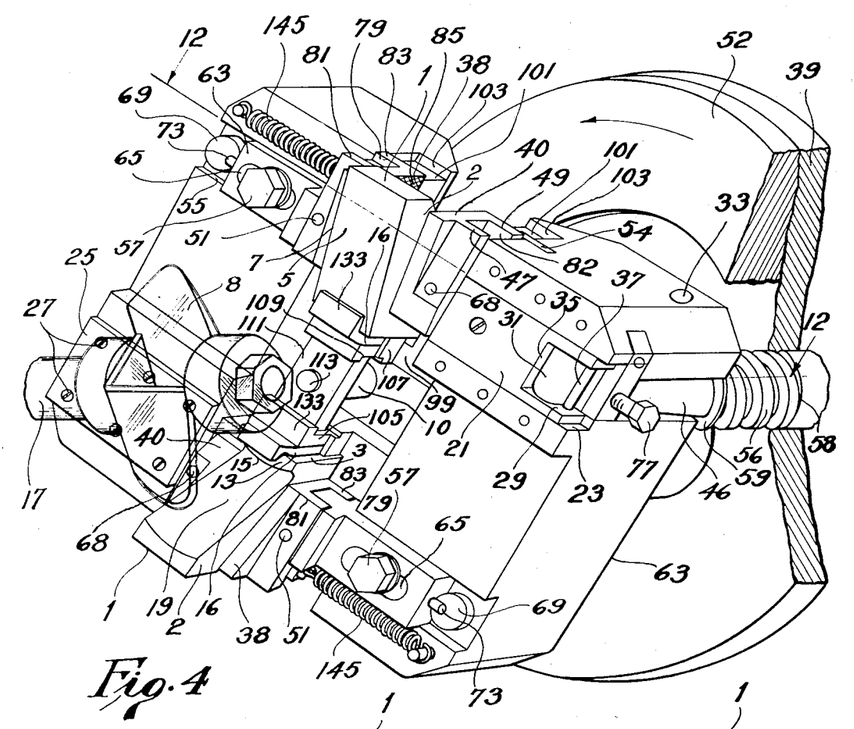
Fig. 4 is a perspective of a portion of the machine shown in Fig. 1, but upon a larger scale, parts being removed for clearness, and showing the cutter in phantom.
Figure 5:
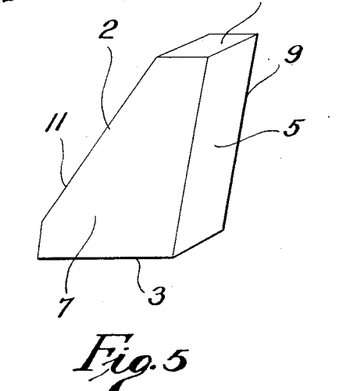
Fig. 5 is a perspective of a wood-heel block before it is operated upon in the illustrative machine.
Figures 12, 13, 14, 15:
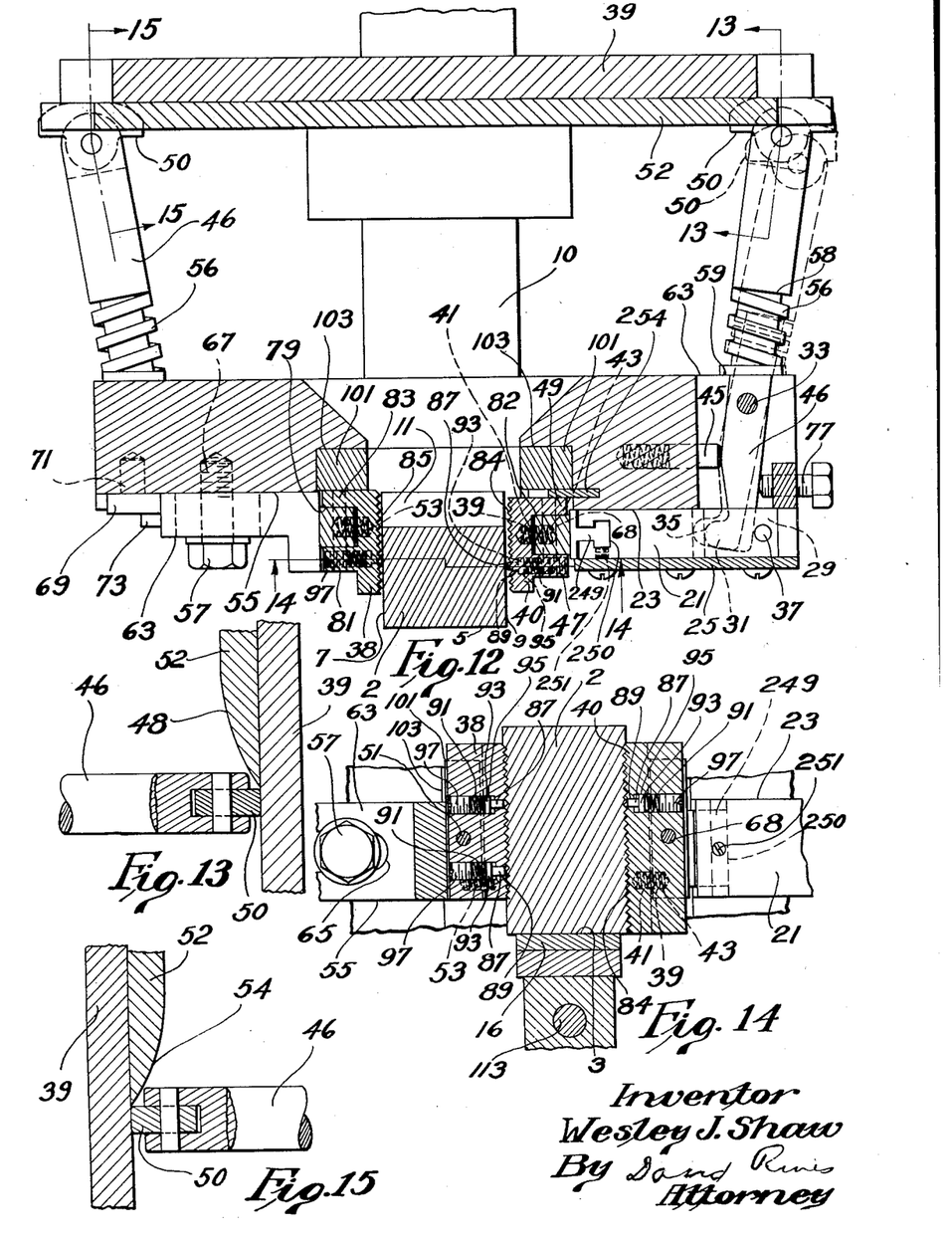
Fig. 12 is a horizontal section taken upon the line 12—12 of Fig. 4, looking in the direction of the arrows.
Figs. 13 and 14 are vertical sections taken upon the lines 13—13 and 14—14, respectively, of Fig. 12, looking in the direction of the arrows.
Fig. 15 is a vertical section taken upon the line 15—15 of Fig. 12, looking in the direction of the arrows.

The machine that has been chosen to illustrate the invention is adapted to operate upon a wood-heel block 2, Figs. 4 and 12. One such block is shown inverted in Fig. 5. The tread face of the heel block is shown at 1 and the heel-seat face at 3. The breast 5 is bounded by the tread and the heel-seat faces 1 and 3 and the side faces 7 and 9. The face 11 opposite to the breast 5 inclines upward from the tread face 1 toward the heel-seat face 3. The breast 5 may be inclined, as shown, or it may be at right angles to the oppositely disposed tread and heel-seat faces 1 and 3.

Figure 6:
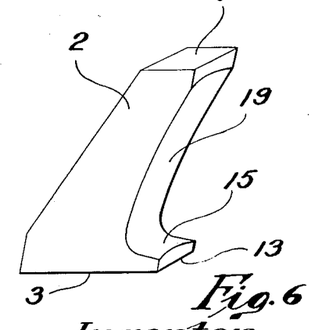
Fig. 6 is a similar view of a wood-heel block after operation in the machine.

Blocks of this shape are placed manually by the operator in a rotary jack, as shown in the upper portion of Fig. 4, between jaws 38 and 40, with the heel-seat face 3 resting upon a heel-seat plate 16, and with the breast portion 5 projecting from the front face of the jack. The jaws 38 and 40 clamp opposite faces 7 and 9 of the block, as is clearly shown in Fig. 4. The jack is then, through means controlled by the operator, given a half turn about the axis of a shaft 10, on which the jack is mounted, in the direction of the arrow, Fig. 4, causing the block to be carried by the jaws 38 and 40, during the rotation of the jack, into and past a rotating grooving-and-shank-scouring cutter 8, by which the breast portion 19 and shank lip 15 of the block are cut, as shown in the lower portion of Fig. 4 and in Fig. 6. The cutter 8 is rotated about a shaft 17 which is located at right angles to the shaft 10, and is so shaped as to cut a concave groove surface 19 in the breast 5 of the block. The shape of the surface 19 is determined by the circular path of movement of the block 2 about the axis of the shaft 10 and the shape of the cutter 8. A projecting shank lip 13 is at the same time produced in the block, as the heel-seat portion 3 of the block is disposed on the heel-seat plate 16 nearer to the shaft 10 than is the cutter 8 and passes between the shaft 10 and the cutter. Owing to the circular nature of the path of travel of the clamp jaws 38 and 40, about the axis of the shaft 10, the shank lip 13 will be shaped convexly at 15 simultaneously with the grooving operation of the breast, in a single operation. As soon as the grooving-and-shank-lip-shaping operation upon the block 2 is effected, the machine is automatically stopped, and the jaws 38 and 40 are automatically opened to permit the grooved-and-shank-lip-shaped block, which now occupies the lower position illustrated in Fig. 4, to drop out from between the jaws into a receptacle (not shown). The operator then places another block 2 between a second set of jaws 38 and 40 that now occupy the upper position illustrated in Fig. 4, and the machine is then started again by the operator to repeat the operation, the machine continuing to operate in this fashion as fast as the operator can supply the blocks 2. In order to aid the understanding, the ungrooved and the grooved blocks are both shown in position in Fig. 4, but in practice, the grooved block will be dropping out from between the lower jaws 38 and 40 into the receptacle (not shown) after the operator has supplied a fresh block between the upper set of jaws 38 and 40 and just after he has restarted the machine. It will be understood that any desired number of sets or pairs of jaws 38 and 40 or other heel-block clamps may be provided along the circumference of the rotary jack. Two sets or pairs only are illustrated, because the size of the machine is thereby reduced, without lowering the speed of operation, as the operator always has a set of jaws 38, 40 presented to him, near where he is stationed, at the upper part of the jack, at the end of every grooving-and-shank-shaping operation.

In order that the grooved-and-shank-shaped blocks may drop readily from the jack, it is necessary that the jaws 38 and 40 become opened quickly and automatically after each grooving-and-shank-shaping operation. It is furthermore necessary that the jaws 38 and 40 be opened to receive the fresh block prior to the cutting operation and that they become closed in upon the block to clamp it firmly during the travel of the block to and by the cutter 8. In open position, the jaws 38 and 40 are normally separated from each other by a distance greater than the width of the heel block between the side faces 7 and 9. To bring the jaws to closed position, it is preferred to have one jaw of each pair, as the jaw 38, stationary with respect to the jack, and the other jaw 40 of each pair movable toward the stationary jaw 38 in substantially the direction of the periphery of the jack, or the direction of travel of the block; that is, toward the left, as viewed in Fig. 14. The block thus becomes clamped between the jaws 38 and 40 by the mere movement of the movable jaw 40.

In the specific embodiment of the invention that is herein illustrated and described, the closing movement of the movable jaw 40 is effected by a sliding or floating movement. To this end, the movable jaw 40 is connected by a pivot 63 (Figs. 12 and 14) with one end of a pusher 21 that is freely slidable in a transverse recess 23 of the jack. The pusher is held in the recess 23 by a plate 25. The plate 25 corresponding to one of the jaws 40 is shown in Fig. 4, held in place by a screw, but the plate 25 corresponding to the other jaw 40 is, for clearness, omitted from the same figure. The other end of the pusher 21 is provided with a recess 29 into which enters one end 31 of an arm 46 (Fig. 12) that extends beyond the rear face 63 of the jack. The arm 46 consists of two telescoping members, the male of which is pivoted at 33 to the jack and the female of which terminates at a shoulder 58. The arm 46 can thus pivot back and forth between the dash-line and the full-line positions of Fig. 12 during the rotation of the jack. When the arm 46 is moved pivotally toward the dash-line position, its end 31 engages a wall 35 of the recess 29, causing the pusher 21 to close the movable jaw 40 in upon the block 2 so as to clamp it against the stationary jaw 38. When the arm 46 is moved back toward the full-line position of Fig. 12, its end 31 engages a pin 37 mounted in the pusher 21 to cause its return and, therefore, the opening of the jaw 40 and the consequent unclamping of the block 2. The back-and-forth pivotal movement of the arm 46 is effected by a cam 52 (see more particularly Fig. 1) that is provided upon a stationary disk 39 of the machine at the rear of the jack. At a predetermined point in the rotation of the jack at one side of the cutter 8, a cam follower 50, freely pivoted at the rearward extending, free end of the arm 46, automatically engages a rising portion 43 of the cam 52 to effect the pivotal movement of the arm 46 outward from the shaft 10 to the dash-line position of Fig. 12. In this position the female member of the arm 46 telescopes on the pivoted member against the pressure of a stiff coil spring 56 mounted between the shoulder 58 and a plate 59 which rests against the rear jack face, as shown in Fig. 12. This happens after the operator has placed the block 2 upon the heel-seat plate 16, as shown in the upper portion of Fig. 4, and just after he has set the machine into operation, in the manner hereinafter described. The cam 52 then maintains the arm 46 in the dash-line position during the rotation of the jack to cause the block to remain firmly clamped during its advance into the cutter 8. In order to assure positive movement of the arm 46 outward from the shaft 10, and a firm clamping action by the jaw 40, the cam 52 is tapered in cross section, as shown in Fig. 4, so that its thin edge is on the outside. When the grooved-and-shank-shaped block approaches the lower position shown in Fig. 4, on the other side of the cutter 8, the cam follower 50 rides off a descending portion 54 (Fig. 15) at the other end of the cam 52 to permit the arm 46 to return to its full-line position, shown more particularly at the left of Fig. 12, thereby causing the opening of the jaw 40 and the unclamping of the block. The movement of the arm 46 to the dotted-line position of Fig. 12 is effected in opposition to the force exerted by the coil-spring 56, which tends to hold the arm 46 parallel to the shaft 10. The spring 56 automatically returns the arm 46 to the full-line position of Fig. 12 as soon as the cam follower 50 rides off the portion 54 of the cam 52. The return movement is aided by a spring-pressed plunger 45 and is limited by an adjustable stop 77. Though the pairs of jaws 38, 40 rotate with the jack, they are positioned in clamping engagement with the heel block only during their travel from the upper position to the lower position illustrated in Fig. 4.

As the blocks 2 are not all of the same lateral thickness, provision should be made for advancing the jaw 40 by variable amounts towards the jaw 38. Blocks of different thickness will, in that manner, be clamped with equal effectiveness. This result is brought about, according to the preferred embodiment of the present invention, by the pivotal arrangement of the telescoping arm 46 in combination with the stiff coil spring 56 which takes up inequalities in the thickness of a run of blanks. Also by using cams 52 of different dimensions it is possible to throw the arm 46 more or less, thereby providing for clamping blocks of substantially different widths.

Instead of using different cams 52, it is preferred to adjust the one cam 52 in and out parallel to the direction of the axis of rotation of the jack, as the limits of sliding movement of the pusher 23 are similarly affected by such adjustment. To this end, the disk 39 that carries the cam 52 is rendered adjustable in the direction of the axis of rotation of the jack by means of a bolt 135 (Figs. 1 and 2) that is held against longitudinal movement in a stationary part 137 of the frame of the machine and that is threaded into the disk 39 at 139. A pointer 141 on the disk cooperating with a scale 143 on the frame of the machine will enable resetting the disk 39 when it is desired to reproduce a heel that has previously been cut in the machine.

The cam 52 may, in this manner, be adjusted for other purposes also,—as to put greater pressure on the movable jaws, if desired.

Not only do the blocks 2 vary in width, but the width of one block is not always uniform, being sometimes wider at the bottom, for example, than at the top. To secure a firm clamping action notwithstanding this kind of variation, the jaws 38 and 40, or either of them, may be made self-alining. To bring about this result, according to the preferred embodiment of the present invention, the connection 68 of the jaw 40 to the pusher 21 is rendered pivotal, Fig. 14, and a stiff coil spring 39 (Figs. 12 and 14) is seated in opposed recesses 41 and 43 of the jaw 40 and pusher 21. The jaw 40 is normally caused to tilt about the pivot 68 by the spring 39, but the jaw automatically alines itself against the block, in opposition to the force exerted by the spring 39, when it closes in upon the block. For convenience of construction, the jaw 40 is provided with a groove 82 in which the corresponding end of the pusher 21 extends, the pivotal pin 68 extending through the said end of the pusher 21 and the side walls 47 and 49 of the groove 82. When the movable jaw 40 is forced towards the stationary jaw 38, therefore, the jaw 40 will automatically aline itself to grip the block 2 throughout the height of the block, whether the sides of the block are upright or more or less inclined. In order to provide for a more secure gripping action, the clamping face of the jaw 40 is provided with teeth 84.

The self-alining feature of the jaw 40 contributes to the firm clamping action of blocks 2 of different dimension, even when the same cam 52 is employed throughout, particularly if the stationary jaw 38 is also rendered self-alining, as shown in Fig. 14, by pivoting it at 51, and providing it with a spring 53 corresponding to the spring 43 for the jaw 40. The jaws 38 and 40 both yield, therefore, in opposition to the spring pressure, to take up irregularities in thickness in any particular blank.

Still another way of compensating for different widths and sizes of blocks is provided. To this end, the stationary jaw 38 is made adjustable. This may be effected by mounting the pivot 51 upon a support 63 that is slidable in a recess 55 in the front jack face and that may be fixed in slidably adjusted position in the recess by a clamp screw 57. The screw 57 extends through an elongated opening 65 in the support 63 and is threaded into a screw-threaded opening 67 in the wall of the recess 55. A head 69 of a pin 71 fixed in the same wall of the recess limits the extended position of the stationary jaw 38. Different pins 71, with heads 69 of different diameters, are used for heel blocks of different widths. The position of the jaw 38 may, in this manner, be adjusted to correspond to the different widths of the heel blocks. A pin 73 projecting from the support 63 prevents the pin 71 from falling out of place. A spring 145 (Fig. 4) insures that the support 63 shall engage snugly against the head 69 of the pin 71. The stationary jaw 38 is provided with a groove 79 corresponding to the groove 82 of the movable jaw 40, forming side walls 81 and 83. An end of the support 63 is disposed in the groove 79, the pivotal pin 51 extending therethrough and through the side walls 81 and 83. Like the movable jaw 40, the stationary jaw 38 may be provided with teeth 85.

Provision is also made for adjusting the movable jaw 40 vertically, or in an up-and-down direction, as viewed in Fig. 14, in order that the bottom of the jaw 40 shall engage the heel block near the heel-seat face 3, and thereby prevent chipping of the block. According to the specific embodiment of the invention that is herein illustrated, this result is brought about by providing the movable jaw 40 with a T-shaped extension 249 (Figs. 12 and 14) that is vertically slidable in a correspondingly shaped slot 250 provided in the pusher 21. The extension 249 may be clamped in vertically adjusted position in any desired manner, as by means of a set screw 251.

It is quite important that the jaws 38 and 40 hold the block firmly in place, and against any tendency for the block to rise from the heel-seat plate 16 during the cutting action. In this connection it is clear that the jaws 38 and 40 are, when in non-clamping position, held by the springs 39 and 53 somewhat diverging outward away from the shaft 10, instead of parallel. As the jaw 40 is moved in toward the jaw 38, its lower portion engages the heel block before its upper portion, and forces the block down against the heel-seat plate as it closes in further against the block, the spring 39 yielding to permit such action. In this way, the heel block is forced down against the heel-seat plate 16 and held there, and prevented from rising, and without any necessity for clamping the block also against the tread face 1. Blocks of considerably varying width are clamped with equal effectiveness.

To prevent the teeth 84 or the teeth 85 from continuing to bite into the block after the jaws have been opened,—which would tend to prevent the block from falling out from between the opened jaws at the end of the cutting operation,— the jaws 38 and 40 are each provided with one or more dogs 87 that are normally spring-pressed through openings 89 in the faces of the jaws by coil springs 91. Each dog 87 is provided with an enlarged collar 93 seated in a recess 95, the springs 91 being forced into contact with the collars 93 at one end and against adjustable buttons 97 at the recesses 95 at the other end. The dogs may be omitted, if desired.

In order to adjust the convexity of the curve 15, the positions of the cutter and of the block 2 upon the jack must be adjusted toward and from the axis 10 of rotation of the jack. The former adjustment will be described below. The latter consideration involves adjusting the position of the heel-seat plate 16 to and from the axis of rotation of the jack. To this end, the plate 16 is carried by the neck 99 of a U-shaped frame the arms of which are indicated at 101 (see more particularly Figs. 4, 7 and 12). These arms 101 are adapted to slide, with a tight fit, towards and from the axis 10 of rotation of the jack in guides 103 of the jack, thereby carrying the heel-seat plate 16 to different distances from the axis of rotation of the jack. The guides 103 are disposed behind the recesses 23 and 55, as will be understood from Figs. 4, 7 and 12. The arms 101 that carry the rest 105 for the heel-seat plate 16 are held in place by the stationary jaw 38 and by a strip 254 which separates the jaw 40 from the corresponding arm 101.

The specific manner illustrated of mounting the heel-seat plate 16 upon the rest 105 of the U-shaped frame, and for securing it in adjusted position, will now be described. The rest 105 is provided with two laterally positioned guide plates 107. The rest 105 has a recess 109 on the face opposite to that on which the heel-seat plate rests. The rest 105 engages against a radius piece or plate 111 that is loosely fitted over a terminally reduced portion 113 of the shaft 10. Different-size radius pieces or plates 111 will result in different positions of the heel-seat rest 105. The plate 111 is held in position with a tight fit in the recesses 109 of the two rests 105, against a shoulder 115 of the shaft 10. The parts may be locked together in any desired manner, though it is found, in practice, that a tight fit of the various parts is all that is necessary.

Figures 7, 8, 9, 10, 11:
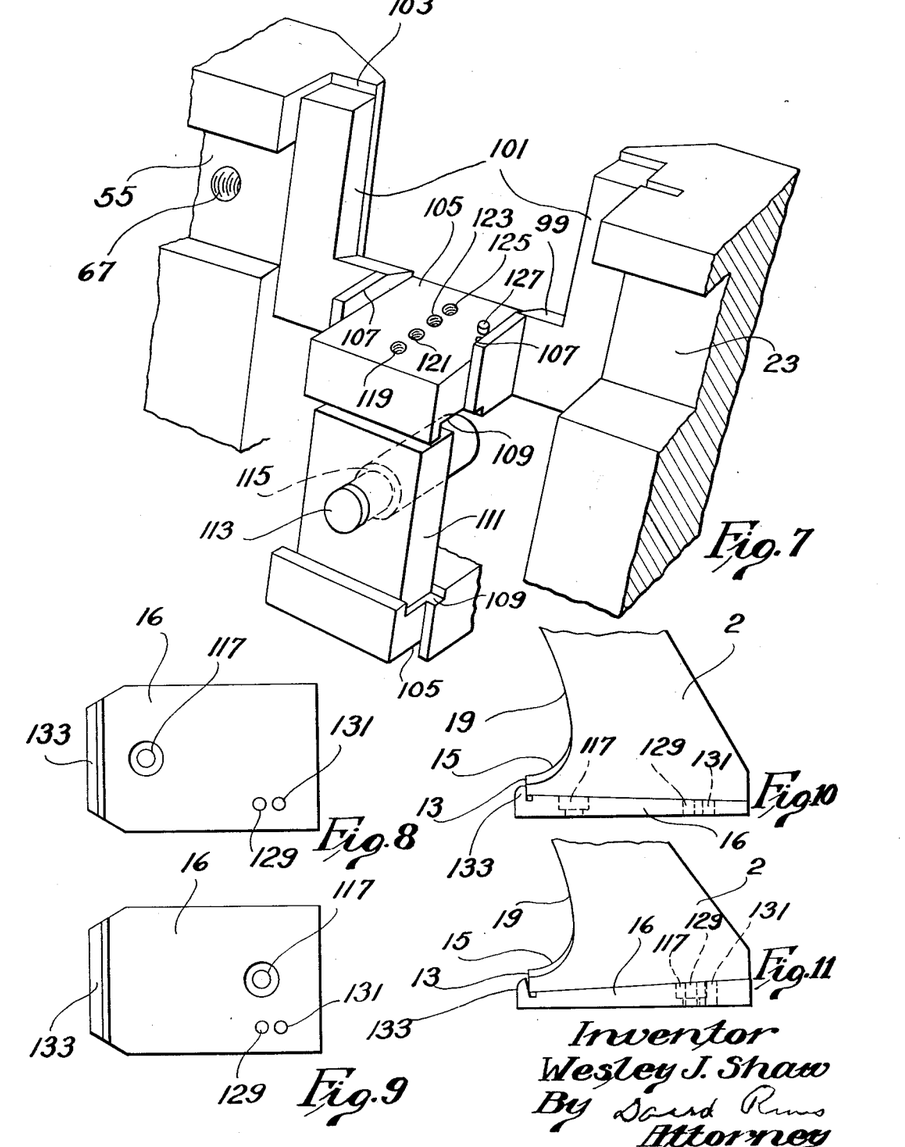
Fig. 7 is a fragmentary perspective similar to Fig. 4.
Figs. 8 and 9 are plans of heel-seat plates for producing different inclinations or rakes in the heel block.
Figs. 10 and 11 are corresponding elevations, with heel blocks in place.

The heel-seat plate 16 may be secured on the rest 105, between the guide plates 107, in any desired way. It is preferred to use a screw (not shown) passing through an opening 117 in the heel-seat plate and threaded in a correspondingly positioned screw-threaded opening 119, 121, 123 or 125 of the rest 105. If a heel-seat plate 16, such as is shown in Figs. 8 and 10, is employed, the screw (not shown) will be threaded in either of the openings 119 or 121. If a heel-seat plate 16 such as is shown in Figs. 9 and 11 is used, the screw (not shown) will extend into either the opening 123 or the opening 125. These two heel-seat plates, as will be noted more particularly from Figs. 10 and 11, are inclined oppositely, so as to give the heel block different inclinations or rakes when presented to the cutter 8, thereby producing the groove 19 at different angles in the heel block. The opening 117 is disposed, for security, in the thicker portion of the heel-seat plate,—in the forward portion of the heel-seat plate shown in Figs. 8 and 10, and the rear portion of the heel-seat plate shown in Figs. 9 and 11.

When the screw (not shown) is threaded in the opening 119, the heel-seat plate 16 of Figs. 8 and 10 will occupy the same position as the heel-seat plate 16 of Figs. 9 and 11 when the screw (not shown) is threaded in the opening 123. The openings 121 and 125 correspond, similarly, to identical positions of adjustment of the respective two heel-seat plates, but further in toward the jack so as to produce a shallow groove 19. Provision is thus made for adjusting the heel-seat plate 16 parallel to the direction of the axis of rotation of the jack. A pin 127 extending integrally from the rest 105 is adapted to enter either of two openings 129 and 131 in either heel-seat plate, first, to aid the proper in-and-out positioning of the heel-seat plate, and secondly, to prevent twisting of the heel-seat plate. Each heel-seat plate 16 is provided with a gage 133 against which the lower portion of the breast face 5 is made to rest snugly when the operator first places the heel block in place on the heel-seat plate, before the clamping operation.

The mechanism for starting and stopping the rotation of the jack will now be described. The shaft 10 of the jack is rotated from a shaft 147 (Figs. 1, 2 and 3) by a clutch, one element of which is indicated at 149 and the other at 155. The element 155 is mounted on the shaft 10. The shaft 147 is hollow so as to enclose the shaft 10 and is integral with the clutch element 149. The hollow shaft 147 and the clutch element 149 integral therewith are rotatable as a unit about the shaft 10 when they occupy the relative positions illustrated in Fig. 2, that is, when the clutch is ineffective. The unit 147, 149 is held against longitudinal movement on the shaft 10 by shoulders $a$ and $b$. Power is supplied to the shaft 147, in a manner presently to be explained, so as to drive it continuously, but the power can not be communicated to the shaft 10 except when the clutch is effective. To render the clutch effective, the clutch element 151, shown as a bolt sliding in a slot 157 in the element 155, and held therein by a plate 159, is inserted between two adjacent pins 153 of a large number of pins that project integrally from the clutch element 149. The rotative movement of the clutch element 149 is thus communicated, through the bolt 151, to the element 155 that is fixed to the shaft 10. In order to start and stop the rotation of the jack, it is merely necessary to slide the bolt 151 in and out from between adjacent pins 153.

Figure 2:
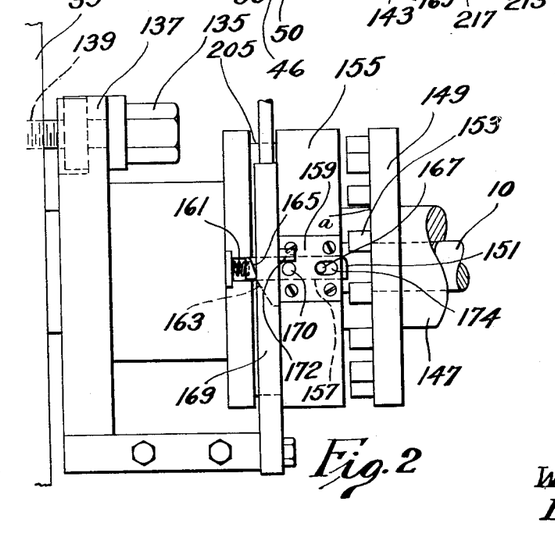
Fig. 2 is a front view of a portion of the machine, upon a larger scale than in Fig. 1.
Figure 3:
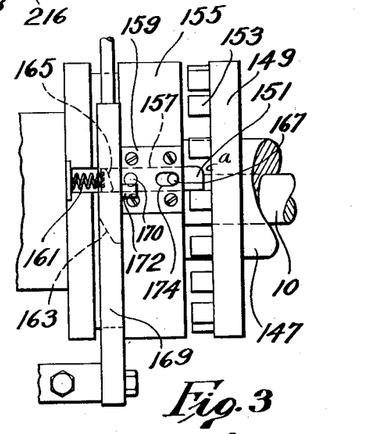
Fig. 3 is a fragmentary view similar to Fig. 2, showing the parts in relatively different positions.
Figure 16:
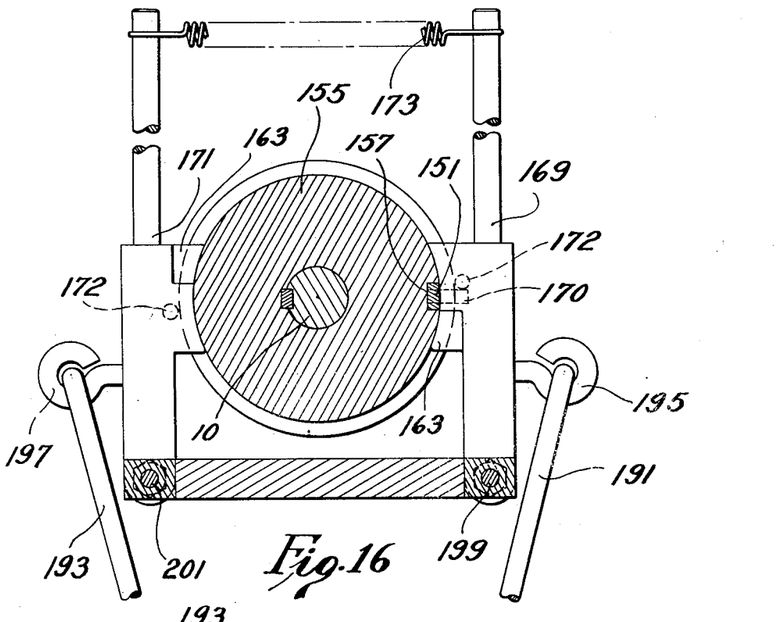
Fig. 16 is a section taken upon the line 16—16 of Fig. 1, looking in the direction of the arrows, but upon a larger scale.

The bolt 151 is forced in between the pins 153, as shown in Fig. 3, by a spring 161. It may be withdrawn from the pins 153, in opposition to the force of the spring 161, by a tapered wedge or cam finger 163 (Figs. 2, 3 and 16) entering a cam recess 165 provided in the bolt 151. So long as the cam finger 163 occupies the cam recess 165, the bolt 151 must occupy the withdrawn, or ineffective, position illustrated in Fig. 2. The bolt 151 may also be manually retracted by means of a pin 167 projecting through an elongated opening 174 of the plate 159, and the bolt 151 may then be locked in retracted position in any desired manner, as by means of a set screw (not shown) to permit repairs.

There are two cam fingers 163, one on each of the levers 169 and 171, which are pivoted on the frame of the machine. These levers are normally held in the positions of Fig. 16 by a spring 173. In these positions, one or the other cam finger 163 will occupy the recess 165 to cause the withdrawal of the bolt 151 and, therefore, the stopping of the rotation of the jack. A pin 170 is provided on the member 155 to ensure that the mechanism shall undergo not more than a single half-revolution at a time. This it does by engaging against a lug 172 provided upon each of two pivoted levers 169 and 171.

Figure 17:
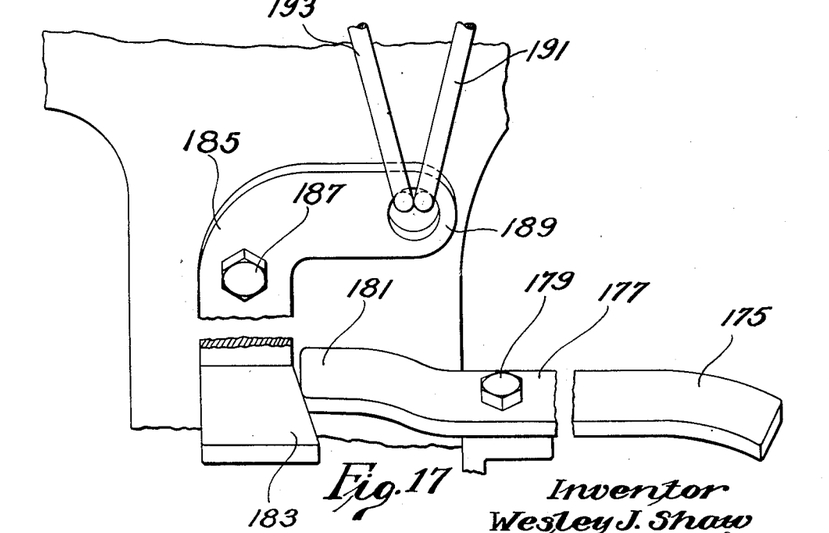
Fig. 17 is a fragmentary perspective of a lower portion of the machine.

To start the jack rotating, the operator presses with his knee against an end 175 of a lever 177, Fig. 17. The lever 177 thereupon pivots about a pivotal point 179 on the machine frame, causing its other end 181 to engage an end 183 of a lever 185. The lever 185 thereupon pivots about a pivotal point 187 on the machine frame, causing the lowering of the other end 189 of the lever 185. Such lowering is accompanied by the lowering of two links 191 and 193, pivoted at one of their ends to the end 189 of the lever 185 and at the other ends, at 195 and 197, to the levers 169 and 171, respectively. The links 191 and 193 thus force the levers 169 and 171 to pivot outward about their respective pivots 199 and 201, in opposition to the force exerted by the spring 173, thereby withdrawing one or the other cam finger 163 from the recess 165. The spring 161 thereupon shoots the bolt 151 forward between adjacent pins 153 of the continuously rotating clutch disk 149, starting the jack rotating.

The operator then immediately releases his knee pressure upon the lever 177. The spring 173 thereupon causes the return of the levers 169 and 171 to the positions illustrated in Fig. 16. The links 191 and 193 then pull upward upon the end 189 of the lever 185, causing its end 183 to return the lever 175 to its original position. The parts are so designed as to permit this operation, the end 181 of the lever 177 engaging the end 183 of the lever 185 considerably to one side of the dead-center position. The cam fingers 163 are thus returned to their normal positions, in the path of travel of the recess 165. One or the other of the cam fingers 163 is, therefore, in readiness to be received again in the recess 165, at the end of a half-revolution thereof, thereby to cause again the withdrawal of the bolt 151 and, therefore, the stopping of the rotation of the jack. The cam fingers 163 are thus caused to enter the recess 165 alternately, thus stopping the rotation of the jack at the end of half revolutions thereof. If more than two sets of clamping jaws 38, 40 are provided upon the jack, of course, a similar number of automatic stopping points in the revolution of the jack will be provided to correspond.

All that the operator needs to do, therefore, after adjusting the jaws for the particular size and shape of block used, is to position the block 2 properly on the heel plate 16 against the gage 133, and to press the lever 177 with his knee. The bolt 151 and the pins 153 immediately act in cooperation to start the jack rotating. Thereupon, a jaw 40, through the operation of the cam 52, presses in against the block 2, clamping it against the jaw 38 and holding it clamped until after the block has been grooved and shank-shaped by the cutter 8 during a half-revolution of the jack. The portion 54 of the cam 52 thereupon causes the opening of the jaws, the spring-pressed dogs 89 positively forcing the ejection of the block into a receptacle (not shown) below. At the end of the half-revolution, too, a cam finger 163 enters the recess 165 to cause the withdrawal of the bolt 151 from between the fingers 153, causing the jack to become disconnected from the source of power, and the elements 170, 172 positively stop the further rotation of the jack. The operator starts the machine and the machine automatically stops its own further operation at the end of each half-revolution of the jack.

Figure 1:
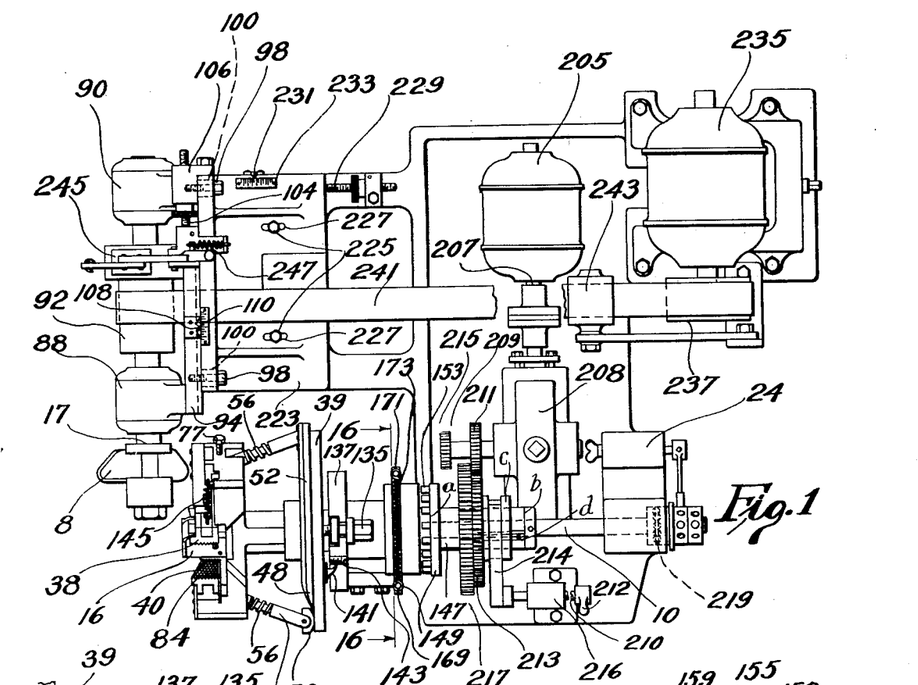
Fig. 1 is a plan of a machine constructed according to a preferred embodiment of the present invention.

Power is supplied to the shaft 147 from a motor 205 (Fig. 1) that drives a shaft 207 and, by means of reduction gearing (not shown) in a casing 208, a shaft 209. The shaft 209 has a gear 211 that meshes with a gear 213 mounted on the shaft 147. To change the speed of rotation of the jack, a second gear 215 of the shaft 209 may be caused to mesh with a second gear 217 of the shaft 147, the gears 211 and 213 being caused, at such time, to unmesh. The gears 213 and 217 are bolted together, or are integral with a hub c, so as to slide as a unit longitudinally on the hollow shaft 147. The unit 213, 217, c is splined to the shaft 147 by a key d so that these elements rotate continuously together. With the parts as shown in Fig. 1, the gear 213 will mesh with the gear 211, and the gear 217 will be caused to mesh with the gear 215 when the unit 213, 217, c is slid over to the left. It is thus possible to change the speed of rotation of the shaft 10 and thus, in turn, the speed of operation of the work holder. The sliding movement of the gears is effected by a handle 212, acting through a rod 210, slidably mounted in a bracket 216 on the machine frame. The rod 210 is provided with a finger 214 that engages a slot in the hub c that carries the gears 213 and 217, to effect a shifting of the hub c and the gears 213 and 217 carried thereby.

In general, then the jack will be rotated at high speed when low heels are operated upon, and at low speed for the high heels and large-size heels.

The shaft 10 extends through the sleeve 155 and the hollow shaft 147 in order that it may be provided, at its other end, with a ball thrust bearing 219 for resisting the action of the cutter 8 upon the heel blocks. The shaft 10 may, if desired, be connected with a counter 24, as illustrated in Fig. 1. The counter 24 counts the number of heels treated by the machine, there being two counts to each revolution of the shaft 10.

As above stated, the position of the groove 19 upon the block 2 depends not only upon the adjustment of the heel-seat rest 105 toward and from the shaft 10, but also upon the position of the cutter 8, for, obviously, the radius of the convex curve 15 will vary in accordance with the position of the cutter 8. It is sometimes necessary to adjust the cutter also for different sizes of heel blocks. The cutter should be positioned substantially in the vertical plane of rotation of the block 2, and to one side of the circular path of travel of the jaws 38, 40, and at the proper distance from the shaft 10. The cutter is shown mounted upon a horizontally disposed shaft 17 that rotates in bearings 88 and 90 and is provided with a pulley 92. The shaft 17 is disposed at right angles to the shaft 10 and substantially in the same plane. The shaft 17, bearings 88 and 90 and pulley 92 are mounted as a unit, for purposes of adjustment, upon a bracket 94. The bracket 94 may be horizontally adjusted, in a direction parallel to the plane of rotation of the jack, upon a second bracket 223, and may be secured in adjusted position by bolts 98 extending through elongated openings 100. A micrometer adjustment is provided by a threaded stem 104 that extends through a lug 106 in the frame of the machine and that engages the bracket 94. An index 108, upon the bracket 94, and a scale 110, upon the frame of the machine, serve for accurate repositioning of the bracket 94 when it is desired to reproduce a given heel.

It is also essential to adjust the cutter to and from the block, and it is for this reason that the bracket 94 is secured to the second bracket 223 instead of directly to the frame of the machine. Unless these various adjustments are provided for, it will not be possible to obtain the desired number, variety and shape of heels. The bracket 223 is adjustable along the frame of the machine in a direction parallel to the axis of rotation of the jack, and may be secured in adjusted position by bolts 225 passing through slots 227 in the same manner as before described. A threaded stem 229 may serve for the bracket 227 a purpose like to that of the stem 104 for the bracket 94. An index 231 and a scale 233 serve for a purpose similar to that of the index 108 and the scale 110, but in a direction at right angles to that formerly described.

After the cutter 8 has been properly adjusted, the position of the heel-seat rests 105 will be adjusted to correspond, as before described. In this manner, the shape of the curve 15 and the thickness of the shank lip 13 may be controlled in any size and shape of block.

The cutter shaft 17 is driven from a motor 235 that turns a pulley 237 for driving a belt 241 that passes over the pulley 92. A belt tightener 243 tensions the belt 241. The cutter shaft is under the control of a brake 245 that is normally held open by a spring 247 and that is connected to a spring-controlled treadle (not shown).

What is claimed is:

1. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, means for clamping a heel block, normally ineffective means for relatively moving the clamping means and the cutter along a curved path to cause the cutter to engage the breast of the block held by the clamping means, means controlled by the operator for rendering the said means effective, and means for stopping the relative movement of the clamping means and the cutter after the cutting operation.

2. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, normally ineffective means for clamping a heel block, normally ineffective means for relatively moving the clamping means and the cutter along a curved path to cause the cutter to engage the breast of the block held by the clamping means, means controlled by the operator for rendering the clamping means effective to clamp the block and the moving means effective, means for stopping the relative movement of the clamping means and the cutter, and means for rendering the clamping means ineffective so as to release the block after the cutting operation.

3. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, two jaws adapted to be moved relatively toward each other to engage the sides of the block to clamp the block, normally ineffective means for relatively moving the clamping jaws and the cutter along a curved path to cause the cutter to engage the breast of the block held by the clamping jaws, means controlled by the operator for causing the two jaws to move relatively toward each other to clamp the block and for rendering the moving means effective, means for stopping the relative movement of the clamping means and the cutter, and means for relatively separating the jaws to release the block after the cutting operation.

4. A machine for grooving heel blocks at the breast and shaping the shank lips of the blocks both in a single operation, the said machine having, in combination, a heel-breast-grooving-and-shank-shaping cutter for grooving the breast of the block and shaping the shank lips, a rotary jack having a plurality of circumferentially disposed heel-block clamps, normally ineffective means for rotating the jack to cause the clamps to present the breasts of the blocks clamped thereby to the cutter during the rotation of the jack, means controlled by the operator for rendering the jack-rotating means effective to rotate the jack, and means for stopping the rotation of the jack after a cutting operation upon a block.

5. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, a rotary jack having a plurality of circumferentially disposed normally ineffective heel-block clamps, normally ineffective means for rotating the jack to cause the clamps to present the breasts of the blocks clamped thereby to the cutter during the rotation of the jack, means controlled by the operator for rendering the clamps successively effective to clamp the blocks and the jack-rotating means effective to rotate the jack, means for stopping the rotation of the jack, and means for rendering the clamps successively ineffective so as to release the blocks after a cutting operation.

6. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, a rotary jack having a plurality of circumferentially disposed heel-block clamps, each clamp comprising two jaws adapted to be moved relatively toward each other to engage the sides of the heel block to clamp the block, normally ineffective means for rotating the jack to cause the clamps to present the breasts of the blocks clamped thereby to the cutter during the rotation of the jack, means controlled by the operator for successively causing the two jaws of each clamp to move relatively toward each other to clamp a block and for rendering the jack-rotating means effective to rotate the jack, means for stopping the rotation of the jack, and means for successively relatively separating the two jaws of each clamp so as to release the block held thereby after a cutting operation.

7. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, a rotary jack having a plurality of circumferentially disposed heel-block clamps, each clamp comprising two jaws adapted to be moved relatively toward each other to clamp the block, normally ineffective means for rotating the jack to cause the clamps to present the breasts of the blocks clamped thereby to the cutter during the rotation of the jack, means disposed at a predetermined position at one side of the cutter and operable during the rotation of the jack to cause the two jaws of each clamp to move relatively toward each other to clamp a block, means disposed at a predetermined position at another side of the cutter and operable during the rotation of the jack to permit relative separation of the two jaws of each clamp so as to release the block held thereby after a cutting operation, means controlled by the operator for rendering the jack-rotating means effective to rotate the jack, and means for stopping the rotation of the jack after a cutting operation.

8. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, a rotary jack having a plurality of circumferentially disposed heel-block clamps, each clamp comprising two jaws, one of each of the said two jaws being stationary with respect to the jack and the other of each of the said two jaws being movable with respect to the jack toward a stationary jaw to clamp the block against the said stationary jaw, normally ineffective means for rotating the jack to cause the clamps to present the breasts of the blocks, clamped thereby to the cutter during the rotation of the jack, means disposed at a predetermined position at one side of the cutter and operable during the rotation of the jack to move each movable jaw towards the corresponding stationary jaw to clamp a block, means disposed at a predetermined position at another side of the cutter and operable during the rotation of the jack to permit each movable jaw to separate from the corresponding stationary jaw to release the block held thereby after a cutting operation, means controlled by the operator for rendering the jack-rotating means effective to rotate the jack, and means for stopping the rotation of the jack after a cutting operation.

9. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, a rotary jack having a plurality of circumferentially disposed heel-block clamps, each clamp comprising two jaws, one of each of the said two jaws being stationary with respect to the jack and the other of each of the said two jaws being movable with respect to the jack toward a stationary jaw to clamp the block against the said stationary jaw, normally ineffective means for rotating the jack to cause the clamps to present the breast of the blocks clamped thereby to the cutter during the rotation of the jack, each movable jaw having a cam follower, a cam disposed at a predetermined position at one side of the cutter and adapted to engage the cam follower during the rotation of the jack to effect the movement of each movable jaw toward the corresponding stationary jaw to clamp a block, means disposed at a predetermined position at another side of the cutter for permitting the cam follower to disengage from the cam during the rotation of the jack to separate each movable jaw from the corresponding stationary jaw to release the block held thereby after the cutting operation, means controlled by the operator for rendering the jack-rotating means effective to rotate the jack, and means for stopping the rotation of the jack after a cutting operation.

10. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, a rotary jack having a plurality of circumferentially disposed heel-block clamps, each clamp comprising two jaws, one of each of the said two jaws being stationary with respect to the jack and the other of each of the said two jaws being movable with respect to the jack toward a stationary jaw to clamp the block against the said stationary jaw, normally ineffective means for rotating the jack to cause the clamps to present the breasts of the blocks clamped thereby to the cutter during the rotation of the jack, each movable jaw having a cam follower and a spring, a cam disposed at a predetermined position at one side of the cutter and adapted to engage the cam follower during the rotation of the jack to effect the movement of each movable jaw in opposition to the force exerted by the spring toward the corresponding stationary jaw to clamp a block, means disposed at a predetermined position at another side of the cutter for permitting the cam follower to disengage from the cam during the rotation of the jack to permit the corresponding spring to separate each movable jaw from the corresponding stationary jaw to release the block held thereby after the cutting operation, means controlled by the operator for rendering the jack-rotating means effective to rotate the jack, and means for stopping the rotation of the jack after a cutting operation.

11. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, a rotary jack against which a heel block is adapted to rest with the seat of the block in engagement with the jack, two jaws relatively movable toward each other in substantially the direction of the periphery of the jack to engage the sides of the block to clamp the block, and means for relatively rotating the jack and the cutter to cause the cutter to engage the breast of the block.

12. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, a rotary jack having a plurality of circumferentially disposed heel-block clamps, each clamp comprising two jaws, a block being adapted to rest against the jack between the two jaws of each clamp and with the seat of the block in engagement with the jack, one of each of the said two jaws being stationary with respect to the jack and the other of each of the said two jaws being movable with respect to the jack in substantially the direction of the periphery of the jack toward the stationary jaw to cause the sides of the block to be engaged by the jaws and thereby to cause the block to become clamped, and means for rotating the jack to cause the clamps to present the breasts of the blocks clamped thereby to the cutter during the rotation of the jack.

13. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, a rotary jack having two clamps disposed diametrically opposite to each other, the jack having two diametrically opposed positions in which it is normally at rest so that an operator at a predetermined station may present a block to each of the clamps in turn while the jack is at rest, the clamps being ineffective to clamp a block when the jack occupies either of the said two positions, means under the control of the operator for rotating the jack from either of the said two positions to the other of the said two positions to cause the clamps successively to present the breasts of the blocks clamped thereby to the cutter during the rotation of the jack, and means for rendering the clamps successively effective to clamp the blocks prior to each cutting operation and for rendering the clamps successively ineffective so as to release the blocks after each cutting operation.

14. A clamp for a heel block comprising two jaws for clamping the sides of the block, a heel-seat plate against which the seat of the block is adapted to rest, and means permitting the adjustment of the heel-seat plate longitudinally of itself.

15. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, a rotary jack having a plurality of circumferentially disposed heel-block clamps, each clamp having a portion against which the seat of the block is adapted to rest, means permitting adjustment of the said portion toward and from the axis of rotation of the jack, means for rotating the jack to cause the clamps to present the breasts of the blocks clamped thereby to the cutter, and means for adjusting the speed of rotation of the jack.

16. A clamp for a heel block comprising two jaws for clamping the sides of the block, one of the jaws being adjustable and the other jaw being stationary, each of the jaws having a self-alining, spring-pressed clamping face.

17. A clamp for a heel block comprising a frame, a heel-seat plate against which the seat of the block is adapted to rest, a stationary jaw arranged to hold the heel-seat plate in position on the frame, means for securing the stationary jaw to the frame, a jaw movable toward and from the stationary jaw, the stationary and the movable jaws being adapted to engage the sides of the block when the seat of the block rests on the heel-seat plate, and means for actuating the movable jaw toward the stationary jaw.

18. A clamp for a heel block comprising a stationary jaw, a movable jaw, a pusher movable with respect to the movable jaw for actuating the movable jaw, a movable arm for actuating the pusher, a cam for actuating the movable arm in one direction, and a spring for actuating the movable arm in another direction.

19. A rotary jack comprising a heel-seat plate adjustable towards and from the axis of rotation of the jack, means for adjusting the heel-seat plate parallel to the direction of the said axis, means for securing the heel-seat plate in adjusted position, and a plurality of clamps each for clamping a heel block in position upon the heel-seat plate with the seat of the block resting on the heel-seat plate.

20. A rotary jack comprising a plurality of heel-seat plates adjustable towards and from the axis of rotation of the jack, a radius piece on the said axis against which the plates are adapted to seat, means for holding the heel-seat plates in position against the radius piece, and a plurality of clamps each for clamping a heel block in position upon each heel-seat plate with the seat of the block resting on the corresponding heel-seat plate.

21. A machine of the class described having, in combination, a cutter, a rotary jack, clamping jaws mounted upon the jack so as to rotate with the jack, the jaws being relatively movable in the direction of the periphery of the jack to effect the clamping of a block between the jaws, an arm extending beyond and to one side of the jack, means for rotating the jack, a spring, and a cam located at a predetermined position in the path of travel of the jack for engaging the arm to effect the relative clamping movement of the jaws in opposition to the force exerted by the spring.

22. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, a rotary jack having a plurality of circumferentially disposed heel-block clamps, each clamp comprising a heel seat against which the seat of the block is adapted to rest, two jaws for clamping the sides of the block, means for rotating the jack to cause the clamps to present the breast of a block clamped thereby to the cutter during the rotation of the jack, and means permitting the heel seats to be adjusted to and from the axis of rotation of the jack.

23. A clamp for a heel block comprising a stationary jaw, means for adjusting the position of the stationary jaw, means for yieldingly holding the stationary jaw in adjusted position, a movable jaw, and means for actuating the movable jaw toward the stationary jaw to clamp a heel block between the jaws.

24. A clamp for a heel block comprising a heel-seat plate upon which the heel block is adapted to rest with the seat of the block in engagement with the heel-seat plate, a stationary jaw for engaging a side of the heel block, a movable jaw for engaging another side of the heel block, and means for adjusting one of the jaws in a direction generally perpendicular to the operative surface of the heel-seat plate.

25. A clamp for a heel block comprising a heel-seat plate upon which the heel block is adapted to rest with the seat of the block in engagement with the heel-seat plate, a stationary jaw for engaging a side of the heel block, a movable jaw for engaging another side of the heel block, a rest for the heel-seat plate, the heel-seat plate and the rest having alined openings, means extending through the openings for securing the heel-seat plate to the rest, and means for preventing twisting of the heel-seat plate upon the rest.

26. A machine for grooving heel blocks at the breast and shaping the shank lips of the blocks both in a single operation, the said machine having, in combination, a heel-breast-grooving-and-shank-shaping cutter for grooving the breast of the block and shaping the shank lip, a rotary jack having a plurality of circumferentially disposed heel-block clamps, each clamp comprising a detachable inclined heel-seat plate against which the seat of the block is adapted to rest, means for rotating the jack to cause the clamps to present the breasts of the blocks clamped thereby to the cutter during the rotation of the jack, and means permitting the position of the heel seat plates to be adjusted parallel to the axis of rotation of the jack.

27. A machine for grooving heel blocks at the breast and shaping the shank lips of the blocks both in a single operation, the said machine having, in combination, a heel-block-grooving-and-shank-shaping cutter for grooving the breast of the block and shaping the shank lip, a clamp for clamping a heel block, the clamp being positioned to one side of the cutter and comprising two jaws for clamping the sides of the block and a heel seat against which the block is adapted to rest, and means for actuating the clamp in a curved path from a position to one side of the cutter to a position to the other side of the cutter to cause the block to be actuated into the cutter to groove the breast and scour the shank of the block.

28. A machine of the class described having, in combination, a cutter, means for clamping a heel block, normally ineffective means for relatively moving the clamping means and the cutter along a curved path to cause the cutter to engage the block held by the clamping means, means controlled by the operator for rendering the first-named means effective, and means for stopping the relative movement of the clamping means and the cutter after the cutting operation.

29. A clamp for a heel block comprising a longitudinally adjustable heel-seat plate, means for securing the heel-seat plate in adjusted position, and two clamps for clamping a heel block in position upon the heel-seat plate with the seat of the block resting on the heel-seat plate.

WESLEY JOHN SHAW.